Oct. 13, 1953     J. B. WADHAMS     2,655,588
HIGH-FREQUENCY INDUCTOR
Filed Aug. 19, 1949

INVENTOR.
JAMES B. WADHAMS
BY
*Alfred C. Boely*
ATTORNEY

Patented Oct. 13, 1953

2,655,588

UNITED STATES PATENT OFFICE 2,655,588

HIGH-FREQUENCY INDUCTOR

James B. Wadhams, Cleveland, Ohio, assignor to The Ohio Crankshaft Company, Cleveland, Ohio, a corporation of Ohio Application August 19, 1949, Serial No. 111,288

2 Claims. (Cl. 219—47)

This invention pertains to the art of high-frequency induction heating and, more particularly, to the high-frequency inductor which effects the actual inducing of heating currents in a workpiece.

The invention is particularly adapted to and will be described with reference to the continuous and sequential heating of the ends of rods, such as valve rods or the like.

Heretofore, in the heating of such rod ends, it has been conventional to move or index the ends into fixed heating relationship with a high-frequency inductor, energize the inductor from a power source until the end of the rod reaches the desired temperature, quench and move the rod from the vicinity of the inductor while, at the same time, indexing a new rod into heating position with the inductor. Such a method requires a complicated indexing-type rod support. The power must be turned off during the indexing operation, further complicating the equipment. This also results in a low average power output in relation to the peak power demand on the power source.

The present invention contemplates a high-frequency inductor which may be continuously energized and past which the ends of workpieces or rods may be continuously moved at a high rate and comprised of a first or preheating inductor portion and a second or final-heating inductor portion. The first portion is of the type which normally provides a relatively poor coupling factor with a workpiece and relies partly on the magnetic properties of the material of the workpiece to give the necessary coupling factor. This results in efficient heating of the workpiece until it reaches the Curie point or that temperature where the workpiece loses its magnetic properties. Then the coupling factor drops off and further increases in temperature ceases. This first portion also is capable of effecting its heating over a relatively large portion of the path of movement of the workpiece. The Curie point temperature is only slightly below the critical temperature or that necessary to effect hardening of steel and the workpiece is heated to this temperature as it moves to the second portion.

The second portion is of a type which has a good coupling factor with the workpiece, regardless of its magnetic properties but only a much shorter portion of the path of movement of the workpiece. The second portion supplies only the additional energy required to raise the temperature of the workpiece from the Curie point temperature to the critical temperature. As the temperature change is small, the heating may be done very rapidly, so rapid in fact that the workpiece need not be stopped during its movement under the second portion. The first portion is continuously coupled to and supplying energy to the workpieces, resulting in a more uniform loading and efficient use of the power source.

In the preferred embodiment of the invention, the first or preheating portion of the inductor comprises generally a pair of spaced, parallel, elongated conductors adapted to be disposed in proximity to the path of movement of the workpieces. The second or final-heating portion of the inductor comprises a 360-degree conductor loop connected in electrical series with the exit end of the parallel conductors and disposed in the same plane thereof so that as the workpieces leave the first portion, they pass in electrically-coupled relationship with the second portion.

An object of the present invention is to provide a simple, efficient inductor capable of being energized continuously and of rapidly heating portions of a plurality of continuously-moving metallic parts to a quench-hardening temperature.

A further object is the provision of such a high-frequency inductor comprising a first or preheating portion adapted to heat portions of a steel workpiece to and hold it in the vicinity of the temperature where the piece loses its magnetic properties and a second portion adapted to rapidly heat from this temperature to above the critical temperature.

Another object is the provision of a high-frequency inductor comprised of two spaced apart parallel conductors connected at one end by a 360-degree loop of conductor.

The invention may be embodied in certain arrangements of conductors and, for the purposes of illustration, a preferred embodiment is described in this specification and shown in the attached drawing which is a part hereof, and wherein.

Figure 1:
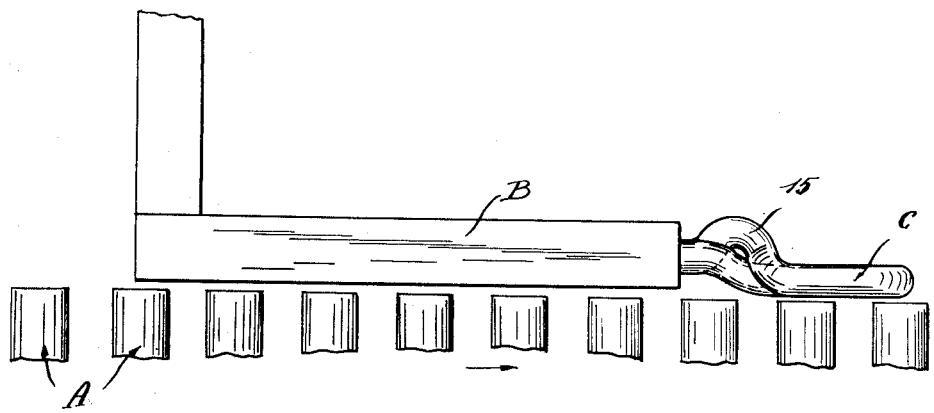
Figure 1 is a side-elevational view of an inductor embodying the present invention in heat-inducing relationship with a plurality of workpieces such as the ends of valve rods.
Figure 2:
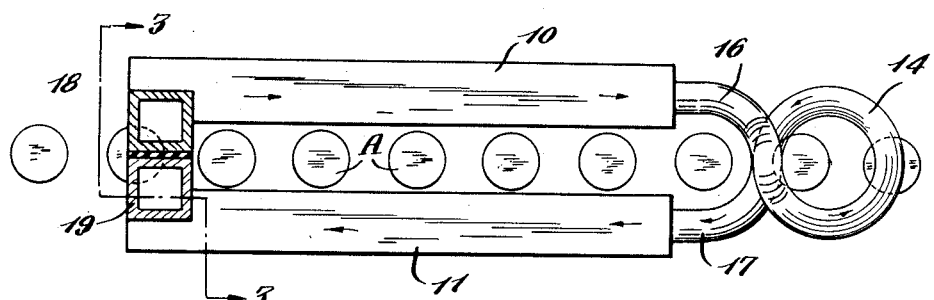
Figure 2 is a top-elevational view partly in section of Figure 1.
Figure 3:
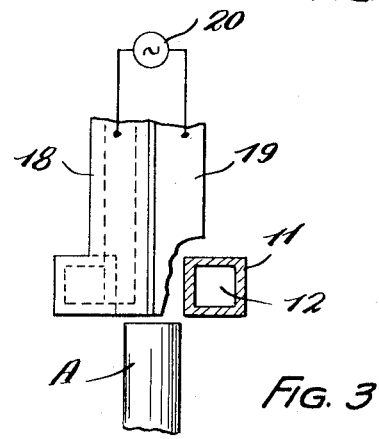
Figure 3 is a view of Figure 2 taken approximately on the line 3—3 thereof.

Referring now to the drawings, the figures show a plurality of workpieces A, such as valve rods, moving past a high-frequency inductor embodying the present invention. The inductor comprises a first or preheating portion B and a second or final-heating portion C. The first or preheating portion B is adapted to heat the ends of the rods A as they move past to approximately the temperature where the workpieces lose their magnetic properties. By the time the workpieces have reached this temperature, they are ready to leave the first portion B and pass into coupled relationship with the second portion C which rapidly and further raises the temperature to above the critical or quench-hardening temperature.

The workpieces A are of steel having conventional magnetic properties. They may be mounted on any conventional type of support (not shown) for movement past the inductor. The support forms no part of the present invention and will not be described further except to say that it may be of the continuously-moving type with the attendant simplicity of construction.

The first portion B of the inductor comprises generally a pair of spaced parallel conductors 10, 11. Each conductor is formed of a highly-conductive material such as copper and, in the embodiment shown, is rectangular in cross section. The conductors 10, 11 preferably have an internal passage 12 through which cooling water may be circulated.

Preferably, the sides of the conductors 10, 11 are spaced apart a distance slightly greater than the transverse width of the workpieces A. The ends of the workpieces do not extend into the space between the conductors but, as shown, are spaced slightly below the bottom plane of the inductor. It will be seen that when high-frequency currents are flowed through the conductors 10, 11, a magnetic field is set up therearound. This magnetic field tends to concentrate between the conductors 10, 11 but because of the magnetic properties of the workpieces A, the field is drawn into the ends of the workpieces A where high-frequency currents are induced therein. These currents heat the ends of the bars rapidly. However, as the ends of the rods reach the temperature where the metal begins to lose its magnetic properties, the flux will tend to return to its normal undistorted path and the ends of the rod will not further heat. The temperature tends to remain at a fixed maximum value regardless of how long the rods are under the portion B.

The second or final-heating portion comprises, in effect, an extension of the conductors 10, 11. As shown, the second portion includes a round tubular conductor formed in the shape of a loop 14 of at least a 360-degree extent, the ends 16, 17 of which loop cross over and then extend in spaced parallel relationship for a short distance to connect with the respective ends of the conductors 10, 11. As shown at 15, the conductor connecting to the conductor 10 is offset vertically a sufficient amount so as to cross over the other end of the loop in spaced insulated relationship.

The second portion C is generally in the same plane as the conductors 10, 11 and its axis is in alignment with the line of movement of the workpieces A. It will be appreciated that each workpiece is only in heating relationship with the loop 14 for a relatively short period of time compared with the portion B. However, as the temperature of the end of the workpiece is already considerably elevated, the length of time that the workpiece must be in coupled relationship with the second portion C is a minimum. Very short periods of time are sufficient to raise the temperature above the desired critical temperature. The loop 14 is shown formed of round copper tubing. It could be square, if desired.

Auxiliary quenching devices can be provided if desired or if the metal from which the workpiece is made is of proper metallurgical construction, air quenching may be employed.

The opposite ends of the conductors 10, 11 have a pair of fish-tail leads 18, 19 extending therefrom in a direction transverse to the plane of the inductor and in close-spaced, insulated, parallel relationship to connect to a suitable high-frequency power source 20.

The workpieces A may be moved past the inductor by any known or preferred means and may be suitably supported on a continuously-moving belt (not shown). They may be mounted upon a rotating disk having suitable clamping means for holding the workpieces in position. If the latter is employed, then obviously the inductor will have to be shaped to correspond to the curved path of the workpieces A.

It will be noted that the ends of the workpieces are slightly below the lower plane of the inductor itself. With such an arrangement, any indexing of the workpiece in a direction transverse to the line of movement is avoided. Furthermore, it is believed that by such an arrangement, the effect of heating only to the Curie point by the first portion B is obtained. If the ends of the workpieces A were disposed physically between the conductors 10, 11, the high-frequency flux would then be forced to pass through the ends of the workpieces A and heating to temperatures above the nonmagnetic temperature would result. With the arrangement shown, however, and relying on the magnetic properties of the steel for coupling, the length of the conductor 10, 11 is relatively unimportant. Automatically, as soon as the ends of the workpiece reach the nonmagnetic temperature, they will generally cease to further heat to any appreciable degree. In other words, the inductor B relies on the magnetic properties of the workpiece to improve its coupling factor thereto so that heating to the Curie temperature may be obtained.

It will be understood that the above described theory of operation of the present invention is the one which, at the present moment, appears to most adequately describe and justify the desirable results obtained. It will be understood that subsequently other reasons for the successful operation may be determined. The above described theory is considered to be illustrative only and is not for the purposes of limitation. All I know is that the inductor shown has proven exceedingly satisfactory in service.

It is quite conceivable that many modifications may be made thereon. For example, it is conceivable that the ends of the conductor forming the second portion C, instead of crossing over as shown in 15, could extend in close-spaced parallel relationship for a short distance. Also, the crossover might be repeated one or more times to provide a plurality of inductor loops for forming the portion C. Multiturns may also be employed.

The method of heating described in this application is claimed in my copending application Serial No. 332,451, filed January 12, 1953.

Thus it will be seen that an embodiment of the invention has been described which accomplishes the objects of the invention and others, is extremely simple in construction while being flexible and versatile in use. It will be appreciated that modifications other than those specifically mentioned will occur to others upon a reading and understanding of the invention as described in the specification. It is my intention to cover such modifications insofar as they come within the scope of the appended claims.

Having thus described my invention, I claim:

1. In a high-frequency inductor for continuously heating a plurality of workpieces moving in a predetermined path on a generally continuously-moving support, said inductor comprising a conductor in the shape of a 360-degree loop and having an elongated pair of terminal leads, said leads crossing over and then extending from the vicinity of said loop in spaced parallel relationship and symmetrically disposed on either side of said path of movement leading toward said loop, the space between said leads defining a workpiece-receiving space.

2. In a high-frequency inductor for heating a plurality of workpieces moving in a predetermined path on a generally continuously-moving support, said inductor comprising a pair of spaced elongated conductors symmetrically arranged relative to said path of movement and defining therebetween a workpiece-receiving space and a looped conductor at the exit end of said elongated conductors with the axis thereof generally aligned with and generally perpendicular to the path of said movement.

JAMES B. WADHAMS.

References Cited in the file of this patent

UNITED STATES PATENTS

| Number | Name | Date |
|---|---|---|
| 1,900,842 | Northrup | Mar. 7, 1933 |
| 2,184,280 | Clark | Dec. 26, 1939 |
| 2,184,281 | Clark | Dec. 26, 1939 |
| 2,371,459 | Mittelmann | Mar. 13, 1945 |
| 2,385,904 | Witty | Oct. 2, 1945 |
| 2,397,629 | Stevens | Apr. 2, 1946 |
| 2,401,899 | Bierwirth et al. | June 11, 1946 |
| 2,408,190 | Baker | Sept. 24, 1946 |
| 2,428,303 | Wood | Sept. 30, 1947 |
| 2,448,012 | Baker | Aug. 31, 1948 |
| 2,479,980 | Stanton | Aug. 23, 1949 |

FOREIGN PATENTS

| Number | Country | Date |
|---|---|---|
| 616,063 | Great Britain | Jan. 14, 1949 |